Feb. 7, 1933. F. C. SIMON 1,896,563
CAKE MOLDING OR FORMING MACHINE
Filed Dec. 15, 1928 8 Sheets-Sheet 2

INVENTOR.
Forest C. Simon
by Parker & Rochnow
ATTORNEYS.

Feb. 7, 1933.    F. C. SIMON    1,896,563
CAKE MOLDING OR FORMING MACHINE
Filed Dec. 15, 1928    8 Sheets-Sheet 5

INVENTOR.
Forest C. Simon
by Parker & Prochnow
ATTORNEYS.

Feb. 7, 1933.  F. C. SIMON  1,896,563
CAKE MOLDING OR FORMING MACHINE
Filed Dec. 15, 1928  8 Sheets-Sheet 7

INVENTOR.
Frank C. Simon
by
Parker & Prochnow
ATTORNEYS.

Fig. 14.

Patented Feb. 7, 1933

1,896,563

UNITED STATES PATENT OFFICE

FOREST C. SIMON, OF PIQUA, OHIO, ASSIGNOR TO THE FRENCH OIL MILL MACHINERY COMPANY, OF PIQUA, OHIO

CAKE MOLDING OR FORMING MACHINE

Application filed December 15, 1928. Serial No. 326,235.

This invention relates more particularly to improvements in machines of the sort disclosed in Letters Patent No. 1,202,824, granted Oct. 31, 1916, to Alfred W. French, which are used for forming or molding oil bearing meal into cakes, which after being formed, are placed in presses for expressing the oil from the meal.

In machines constructed as disclosed in said patent, the meal is compressed into a shallow cake in a mold or forming box to which the meal is delivered by a charge box which receives a charge of meal from the meal cooker and reciprocates over the mold for carrying the charge of meal to the mold. The cake mold is formed at the upper end of a vertically movable ram between which and a head block above the ram, the cake is compressed. This head block is hinged to swing upwardly from a horizontal pressing position over the ram to permit the filling of the mold by the charge box, and the ends of the cake mold are formed by gates or members which are movable to permit the press cloth, with which the cake is wrapped, to be laid on the bottom of the mold between the side walls thereof before the charge of meal is deposited in the mold and to allow the ends of the cloth to be folded over the meal in the mold before the same is compressed to form the cake. The charge box is reciprocated by hydraulic operating mechanism controlled by a hand actuated valve. The end gate at one end of the mold swings vertically and is actuated by mechanical connections from the operating lever or handle of said control valve. The other end gate slides horizontally and is caused to follow the charge box by a spring when the charge box is advanced to deposit the meal in the cake mold. A plate projecting rearwardly from the upper end of the charge box serves as a gate or valve to close the discharge chute or opening of the meal cooker and prevent the discharge of meal therefrom except when the charge box is in receiving position beneath the discharge opening of the cooker.

One object of my invention is to improve the construction of cake forming machines of this sort whereby they are rendered easier to operate, and safer and more reliable in operation.

Other objects of the invention are to construct the machine so that the operator can operate the same with the minimum exertion and can easily reach and actuate the several control devices of the machine without having to turn from his position facing the machine; also to so construct and arrange the control devices of the machine that the operator uses his hands in actuating the same in such manner that his hands are protected from liability to injury; also to utilize the swinging end gate as the control device for the operating mechanism for the charge box and other parts of the machine, and to provide a mechanism for this purpose which will be reliable in operation and will prevent the charge box from striking the swinging end gate with possible consequent injury to the machine; also to provide simple and effective fluid-pressure-actuated means for operating the sliding end gate and meal discharge valve; also to provide improved fluid-pressure-actuated mechanism for operating the head block by which the head block is both raised and lowered by fluid-pressure; also to provide operating mechanism for the head block which will prevent the possibility of the head block falling and injuring the operator of the machine; also to provide an improved releasing device for the holding latch for the head block; also to provide a safety device for the swinging end gate which operates, when the end gate has been lowered to its operative position, to positively hold the gate down out of the path of travel of the charge box; also to provide fluid-pressure-actuated mechanism controlled by a single control valve or device for operating the charge box, sliding end gate, meal discharge valve and end gate safety device; also to provide a device which holds the press cloth from shifting in the cake mold when filling the mold; and also to improve cake forming machines in the other respects hereinafter described and set forth in the claims.

A represents the ram and B the head block of the cake forming machine. The ram is moved vertically in a cylinder C by hydraulic pressure for compressing the cake between the ram and the head block, and is provided with a horizontally extended upper end or cap $b$ which forms the bottom of the cake mold and preferably has raised side flanges or portions $b'$ which form the side walls of the cake mold. D is the swinging gate or member which forms one end wall of the cake mold and E is the sliding gate or member which forms the opposite end wall of the cake mold. F represents the charge box which normally rests upon the sliding end gate E below the discharge chute or opening of the cooker or container for the meal or material to be molded and is adapted to reciprocate from this position over the cake mold to deliver the charges of meal into the mold, and G represents the sliding valve for closing the meal chute to prevent the discharge of meal therefrom except when the charge box is beneath the chute.

Before the meal is deposited in the cake mold by the charge box, a press cloth H is laid in the cake mold between the side walls thereof and with its ends hanging down at the ends of the ram cap. The swinging end gate D is then lowered to the horizontal position in which it forms the outer end of the cake mold.

The swinging end gate may be pivoted at $d$ to the outer end portion of the ram cap at the rear side thereof, to swing vertically, as in said patented machine, but instead of the end gate being actuated through the medium of the operating lever of the fluid controlling valve for the charge box actuating mechanism, the end gate is lowered by hand and constitutes the operating or control device for the reciprocating mechanism for the charge box. For this purpose the end gate may be provided with a suitable handle 1 at its front end adapted to be grasped by the operator.

Figure 1:
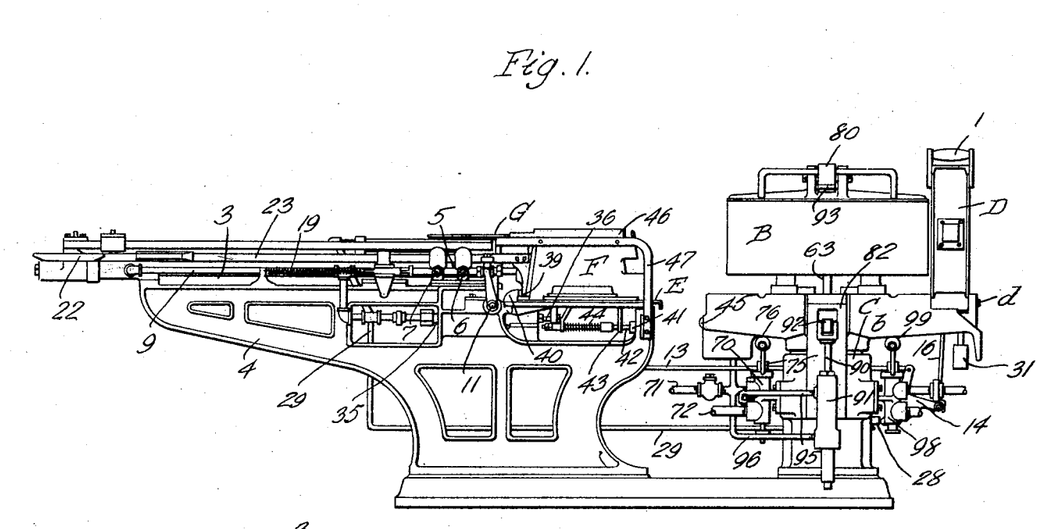
Fig. 1 is a front elevation of a cake forming machine embodying my invention.
Figure 2:
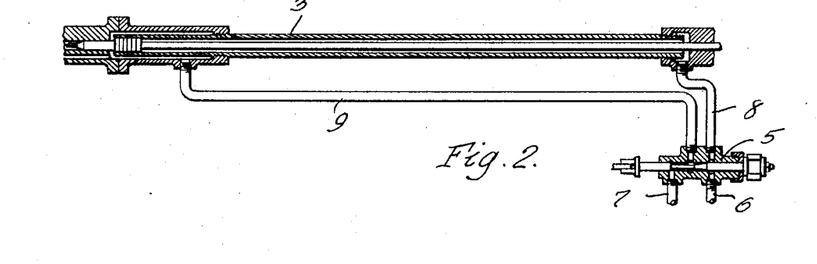
Fig. 2 is a view showing the pipe connections for the fluid-pressure-actuated devices of the parts shown in Figs. 3 and 4.
Figure 3:
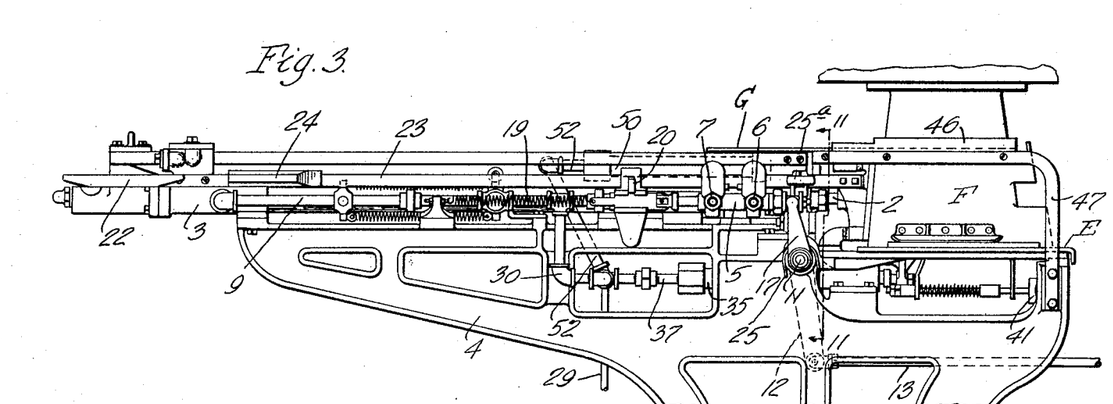
Fig. 3 is a front elevation of the charge box operating mechanism and associated parts of the machine, as shown in Fig. 1, but on an enlarged scale.
Figure 4:
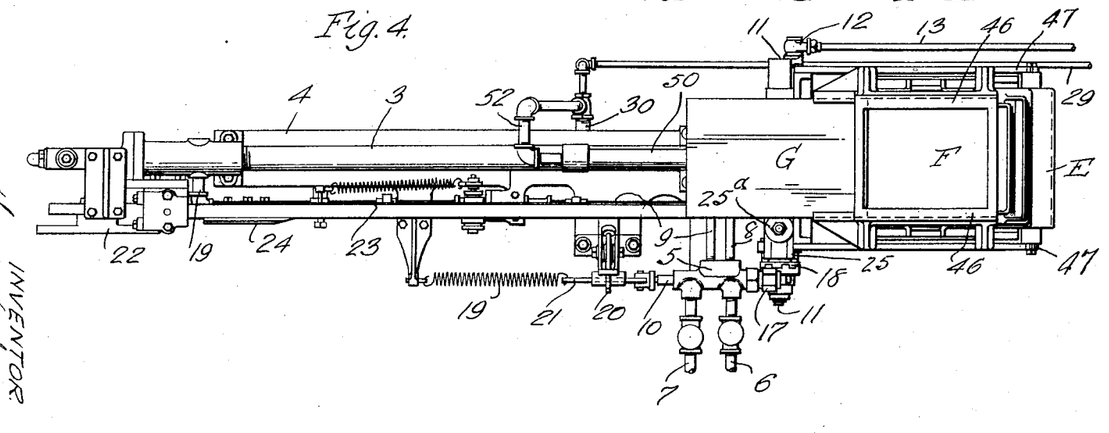
Fig. 4 is a plan view of the parts in Fig. 3.

The charge box may be reciprocated by hydraulic or fluid-pressure-actuated mechanism constructed substantially as shown in said patent, which briefly stated is as follows:

2 represents a rod secured to and extending rearwardly from the charge box and provided with a piston that works in a horizontal cylinder 3 suitably mounted on the stationary frame 4 of the machine. 5, see Figs. 2 and 3, represents a valve for controlling the passage of pressure fluid from a suitable source to and from the charge box cylinder 3. 6 and 7 indicate respectively supply and discharge pipes for the pressure fluid and 8 and 9 indicate pipes leading from the valve respectively to the front and rear ends of the cylinder 3.

In one position of the movable plunger or member 10 of the valve 5, the pressure fluid is admitted through the pipe 9 to the rear end of the cylinder for moving the piston rod 2 and the charge box F forwardly. In its other position the valve plunger connects the pipe 9 leading from the rear end of the cylinder to the discharge pipe 7 to permit the rearward movement of the piston in the cylinder by the pressure on the front end of the piston. The pressure is maintained at all times on the front end of this piston. The effective area of the rear end of the piston is larger than that of the front end of the piston, and when the pressure fluid is admitted to the rear end of the cylinder 3, the piston and charge box will be advanced, whereas when the valve 5 connects the rear end of the cylinder to the discharge pipe 7, the pressure of the fluid on the smaller, front area of the piston will cause the return of the piston and charge box.

Figures 12, 13:
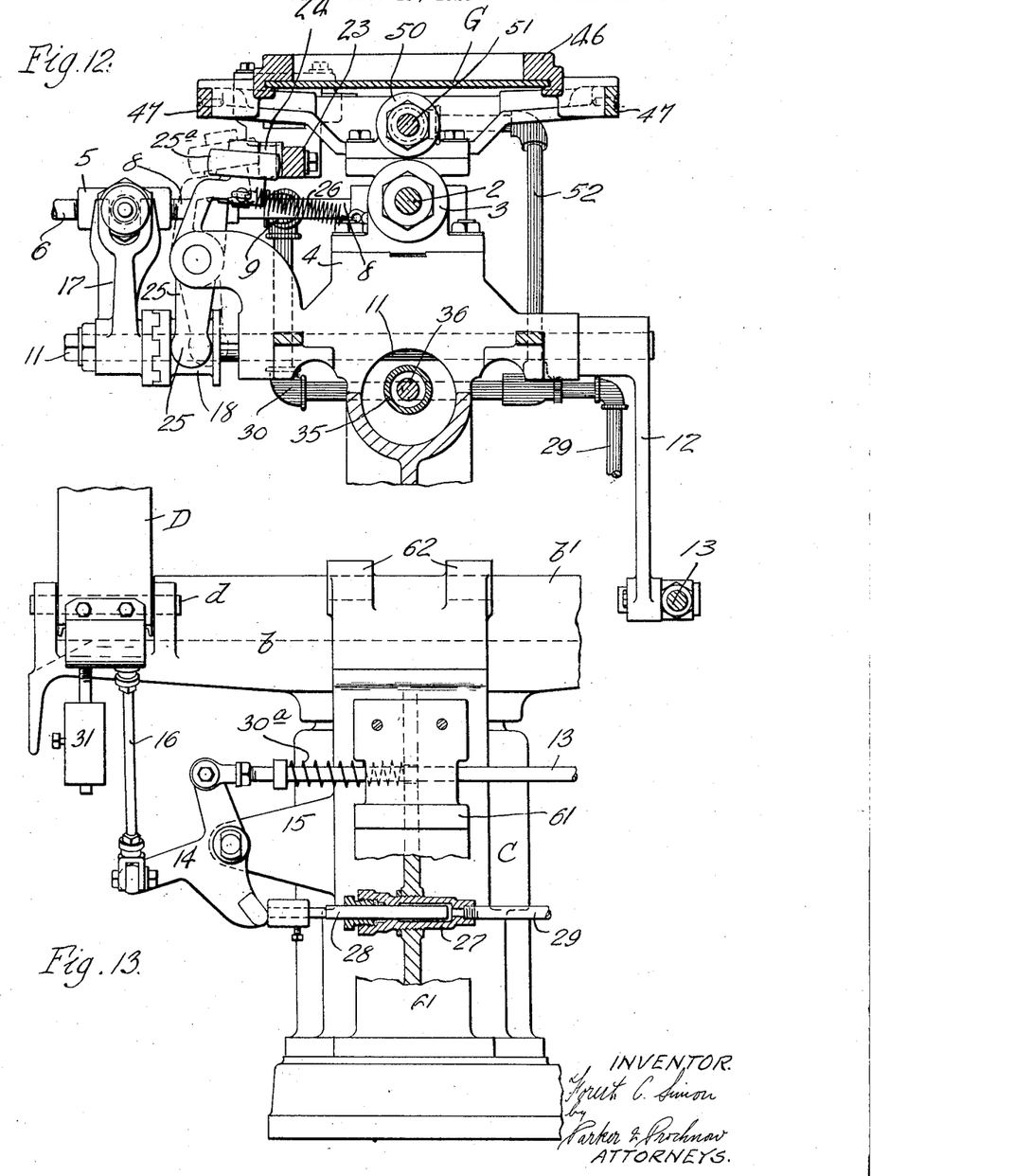
Fig. 12 is a transverse, sectional elevation of the machine on an enlarged scale on line 12—12, Fig. 3.
Fig. 13 is a rear elevation, with the parts broken away and in section, showing the safety holding devices for the swinging end gate.

The valve plunger 10 is moved to the right, as shown in Figs. 2 and 3, to admit the pressure liquid to the rear end of the cylinder 3 by lowering the end gate D which may be operatively connected to the valve for this purpose as follows:

11 is a transverse rock shaft suitably journalled on the frame 4 and connected and at its rear end by an arm 12 and rod 13, see Figs. 12 and 13, to a bell crank lever 14 which is pivoted on a stationary bearing 15 beneath the outer end of the cake mold and is connected by a rod or link 16 to the rear end of the end gate D so that the shaft 11 is rocked by the movement of the end gate to and from its horizontal position. Loosely mounted on the front end of the shaft 11 is an arm 17, Fig. 12, provided with a forked upper end engaging a grooved collar on the valve plunger 10. Splined on the shaft 11 so as to turn with but slide axially on the shaft, is a movable clutch member 18 having projections or parts at its front end adapted, when the clutch member is moved forwardly, to engage cooperating parts on the hub of the arm 17 and couple the arm to the clutch. When the end gate D is in its upright position the sliding clutch member 18 will be coupled to the arm 17 so that if the end gate is lowered to its horizontal position, the shaft 11 and arm 17 will be rocked to move the valve plunger to the right, thereby admitting the pressure fluid to the rear end of the cylinder 3, and advancing the charge box to deposit its charge of meal in the cake mold.

The valve plunger may be held in this position, against the pull of its retracting spring or device 19, during the advance travel of the charge box F, by a suitable latch 20 adapted to engage a shoulder on the valve plunger rod 21. As the charge box approaches the end of its advance movement, a cam 22 secured to a bar 23 extending rearwardly from the charge box, trips the latch 20, disengaging it from the plunger rod 21 and releasing the valve plunger. Also, as the box nears the end of its advance movement, the clutch member 18 is disengaged from the arm 17 to permit the return movement of the valve plunger 18 preferably by a second cam 24 on the bar 23, and adapted to engage a roller 25a on the upper end of a clutch actuating lever 25 which is suitably pivoted on the machine frame and engages a collar or shoulder on the clutch member 18.

When the cam 24 engages the roller 25a it shifts the lever 25, which, when the charge box is at the end of its advance travel and over the end gate D, uncouples the clutch member 18 from the arm 17, permitting the latter and the valve plunger 10 to be retracted to the initial position by the spring 19, thus causing the return of the charge box F. When the charge box has been retracted and the end gate D returned to its upright position, the clutch member 18 is again shifted to couple it to the arm 17, as by a spring 26 connected to the clutch shifting lever 25, ready again for operating the valve when the end gate is again lowered for molding the next cake.

In order to positively hold the pivoted end gate D in its horizontal position and prevent it from lifting so as to be struck by the advancing charge box, and thus avoid interference with the proper operation of the charge box and possible injury to the machine, a safety device is employed preferably comprising a small cylinder 27 stationarily mounted on the machine frame adjacent the bell crank lever 14, and a plunger 28 working in said cylinder is adapted when moved outwardly to hold the bell crank 14 in the position it occupies when the end gate D is in its horizontal position. This safety cylinder 27 is connected by pipes 29 and 30 with the pipe 9 which leads from valve 5 to the rear end of the charge box cylinder 3, so that when the valve 5 is actuated to advance the charge box, pressure fluid will be also admitted to the safety cylinder 27 and move the plunger 28 to and hold it in its outer position, thereby holding the bell crank lever 14 and retaining the end gate D positively in its horizontal, operative position. When the charge box is returned to its receiving position beneath the meal chute, as above explained, the valve 5 permits the escape of pressure fluid from the safety cylinder which allows the plunger 28 to then move inwardly in the cylinder 27 and the pivoted end gate D to return to its upright position. For returning the end gate, a spring 30a is shown surrounding the end gate actuating rod 13 between a stationary portion of the frame and a collar on the rod 13. A weight 31 is also preferably provided on an arm projecting from the rear end of the end gate which counterbalances the weight of the gate and cooperates with the spring 30a in elevating the end gate.

The sliding end gate E is moved to and from the position in which it forms the inner end of the cake mold, preferably by the following mechanism.

Figure 5:
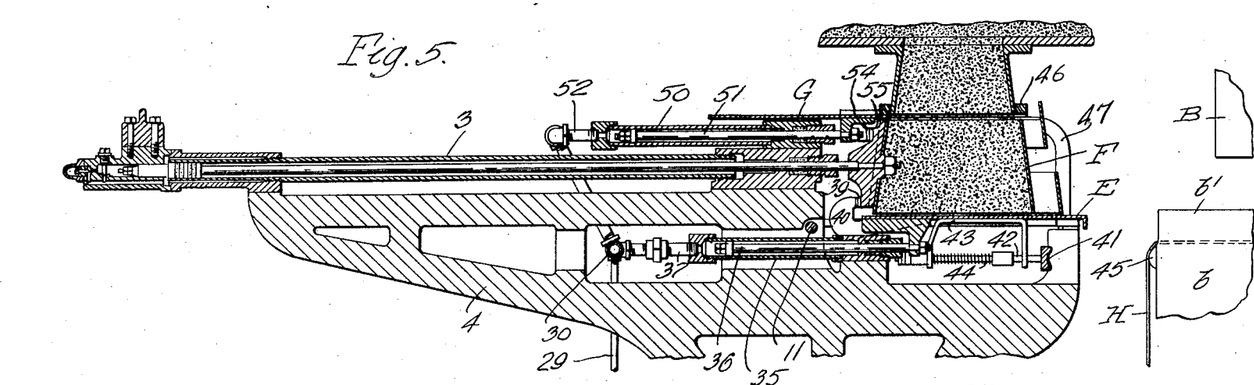
Fig. 5 is a longitudinal sectional elevation of the charge box and associated parts showing the charge box in receiving position beneath the meal discharge chute.
Figure 6:
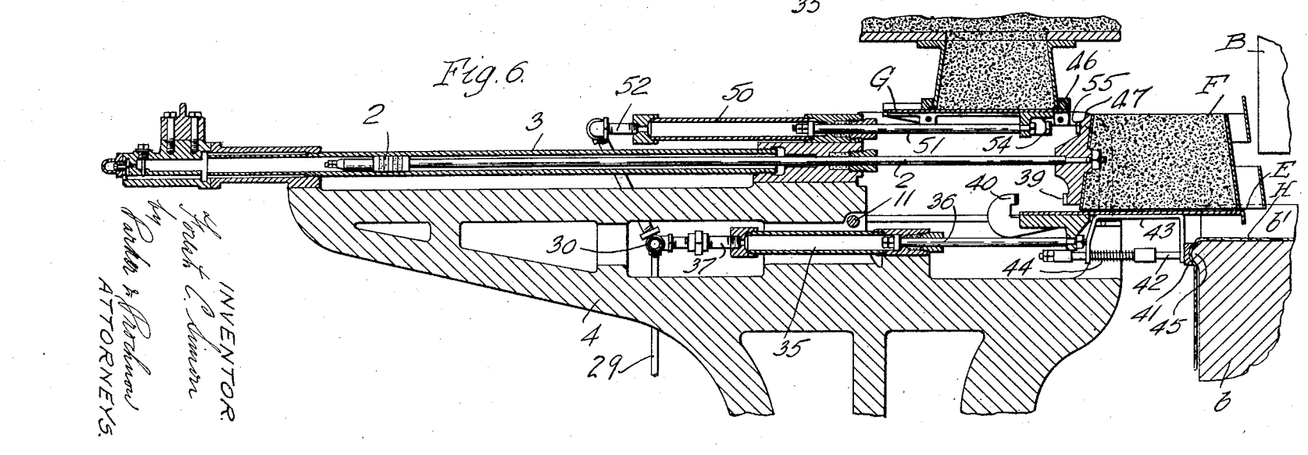
Fig. 6 is a similar view showing the charge box, sliding end gate and meal discharge valve in their advanced positions.
Figure 7:
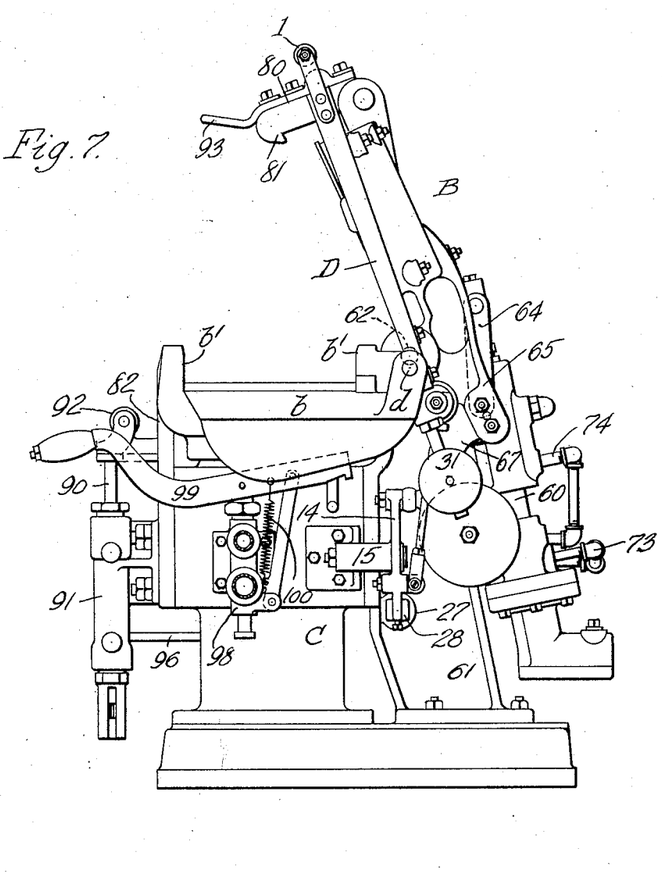
Fig. 7 is an end elevation of the machine showing the swinging end gate and head block in raised position.

35, Figs. 5 and 6, represents a horizontal cylinder mounted on the stationary frame of the machine beneath the charge box cylinder 3. A plunger 36 movable in this cylinder has its outer end fixed to the sliding end gate E. The rear or inner end of the cylinder 35 is connected by pipes 37 and 30 to the pipe 9 leading from the controlling valve 5 to the rear end of the charge box cylinder 3, so that when the valve 5 is operated to advance the charge box, pressure fluid is also admitted to the inner end of the cylinder 35 and moves the plunger 36 to advance the sliding end gate E to the position shown in Fig. 6, in which it forms the inner end of the cake mold.

A lug or part 39 at the inner end of the charge box is adapted, in the return movement of the charge box to its receiving position, to engage a lug or part 40 fixed to the end gate E and also retract the end gate.

41, Figs. 5 and 6, represents a press cloth holder adapted, when the sliding end gate E is advanced, to clamp the hanging, inner end of the press cloth against the inner end of the ram cap for holding the cloth from being shifted in the cake mold during movement of the charge box over the mold. This holder, as shown, may consist of a horizontal, transverse bar 41 beneath the end gate E mounted on rods 42 arranged to slide in guide holes in the brackets 43 secured to and depending from the sliding end gate E. The press cloth holder is urged yieldingly outward, as by springs 44 surrounding the rods 42 between collars on the same and the rear ends of the brackets 43. When the sliding end gate is advanced to the cake mold, the holder 41 moves therewith until it engages and clamps the hanging end of the press cloth against the adjacent end of the ram cap, the clamp being pressed yieldingly against the cloth by springs 44. Preferably the outer face of the bar 41 is grooved and the ram cap is provided with a cooperating rib 45 adapted to force the cloth into the groove in the face of the clamp bar to insure a secure hold of the clamp on the cloth.

The meal discharge valve G preferably consists of a horizontal plate arranged to slide in ways 46 of a guide frame 47 supported at the lower end of the meal chute by bars 48 secured to the main frame. The valve plate is of sufficient area to close the discharge opening and moves a distance substantially equal to the length of the discharge opening to open and close the same. The valve is operated to permit the discharge of meal from the container into the charge box F and to close the discharge opening when the charge box advances from beneath the discharge opening preferably as follows:

The valve is closed as the charge box advances to deposit the meal in the cake mold, preferably by fluid pressure in a cylinder 50 acting on a plunger 51 which moves in this cylinder and is attached at its outer end to the meal valve. This cylinder 50 may be mounted horizontally in the machine above the charge box cylinder 3, and like the operating cylinder for the sliding end gate, its inner end is connected by pipes 52, 30 and 9 to the controlling valve 5, the connections being such that when pressure fluid is admitted to the cylinder 3 for advancing the charge box, it is also admitted to the inner end of the cylinder 50 and causes the meal discharge valve to move forwardly and close the meal discharge opening or chute as the charge box moves forwardly from beneath the chute. The discharge valve is provided beneath the same with a lug or projection 54 arranged in the path of travel of a part 55 at the inner end of the charge box so that when the charge box is retracted, it moves the discharge valve G rearwardly with it and opens the meal chute to permit the discharge of meal from the container into the charge box.

The sliding end gate E and the discharge valve G are moved forwardly when the charge box advances, but each of these devices is actuated independently by the pressure fluid acting on an independent actuating device or piston for each of said elements. However, the flow of the pressure fluid to the independent actuating devices for the charge box, the sliding end gate and the metal discharge valve is controlled by a single valve or device which in turn is controlled or actuated by the movement of the swinging end gate D to its horizontal position. The sliding end gate and meal discharge valve are therefore positively operated by reliable means of simple construction.

After the charge box has deposited the charge of meal in the cake mold and has been retracted, and the sliding and swinging end gates have been returned to their normal position in the manner explained, the operator folds the hanging ends of the press cloth over the meal in the cake mold and then the head block B is lowered over the ram and the latter raised to compress the meal in the mold to form the cake.

The head block B instead of being pulled down by hand and raised by springs, as in said patented machine, is both lowered and raised by a double acting fluid-pressure-actuated mechanism, preferably constructed as follows:

60 represents an upright cylinder arranged at the rear of the ram cylinder C and stationarily secured to the stationary frame part 61, on the upper end of which the head block B is suitably hinged at 62 in rear of the cake mold. Movable up and down the cylinder 60 is a piston 63, the piston rod of which extends through the upper end of the cylinder and is connected at its upper end, as by a pivoted yoke 64, to the hinge arm 65 for the head block in rear of the pivotal axis of the head block. Weights 66 adjustably secured to the rearwardly projecting brackets 67 rigidly secured to the hinge arms 65, are heavy enough to hold the head block in its raised position and prevent it from falling forwardly and to substantially counterbalance the weight of the head block so that but little power is required to raise and lower the head block.

70 represents a valve which controls the admission and discharge of the pressure fluid to and from the upper and lower ends of the cylinder 60 in a manner similar to the action of the operating valve for the charge box. This valve is provided with liquid supply and discharge pipes 71 and 72 and is connected by pipes 73 and 74 to the lower and upper ends respectively of the cylinder 60. The movable plunger or member 75 of the valve is actuated by a lever or handle 76. When the operator is ready to lower the head block B, he raises the lever 76, which raises the valve plunger 75, thereby disconnecting the lower end of the cylinder from the discharge pipe 72 and admitting the pressure fluid to the lower end of the cylinder 60. The piston 63 will then rise and lower the head block B. The valve 70 and pipes are such as to maintain pressure fluid at all times in the upper end of the cylinder 60. When the valve lever 76 is released, it is returned to its normal, lower position by a suitable spring 77, thereby shifting the valve plunger so as to connect the lower end of the cylinder 60 to the discharge pipe 72 and relieve the pressure on the lower end of the piston, whereupon the pressure of the fluid on the smaller upper end of the piston will move the piston downwardly and raise the head block. By the described construction, the fluid pressure acts in connection with the weights 66 to hold the head block up at all times except when the valve 70 is actuated to lower the head block, and if the fluid pressure should fail for any cause, the weights 66 will prevent the head block from falling, so that the head block cannot fall accidentally at any time and injure the operator.

Figures 8, 9:
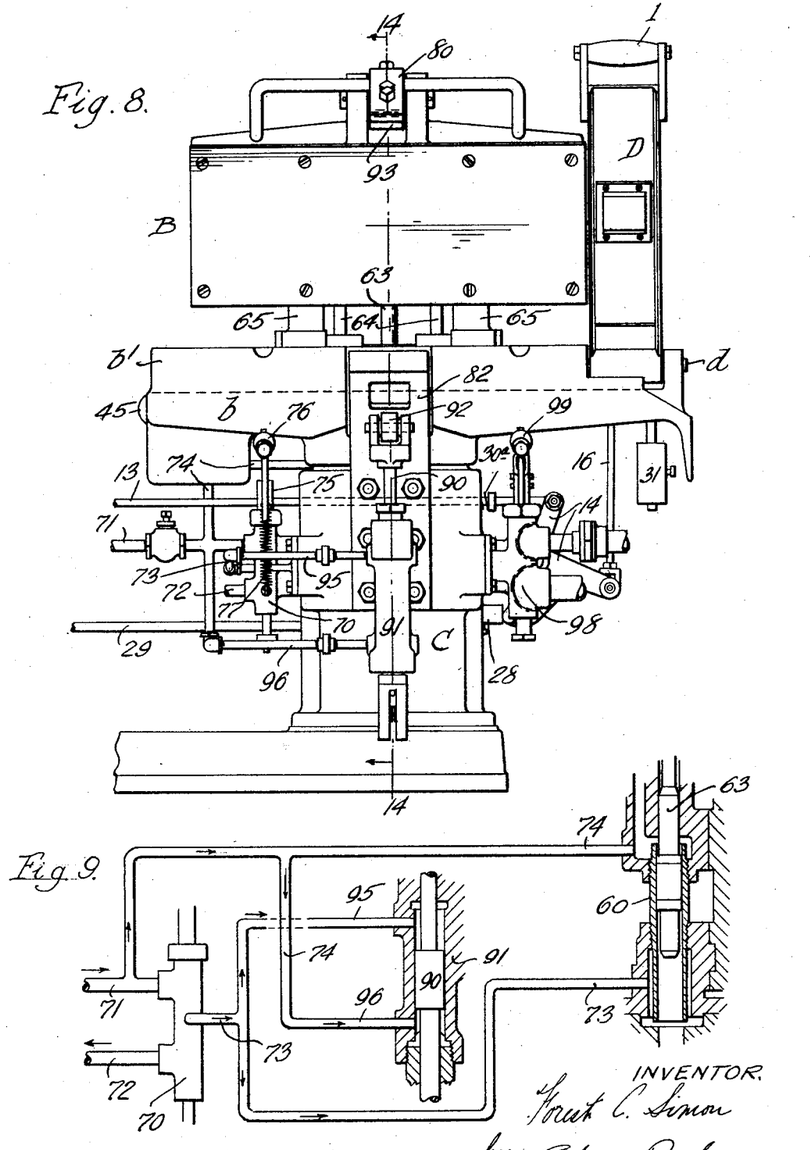
Fig. 8 is a front elevation of the cake mold and associated parts of the machine, with the parts in the same position as shown in Fig. 7.
Fig. 9 is a diagrammatic view of the pipe connections between the head block fluid-pressure-actuating device, the fluid-pressure-actuating device for the head block latch, and the fluid pressure valve for controlling said actuating devices.
Figures 10, 11:
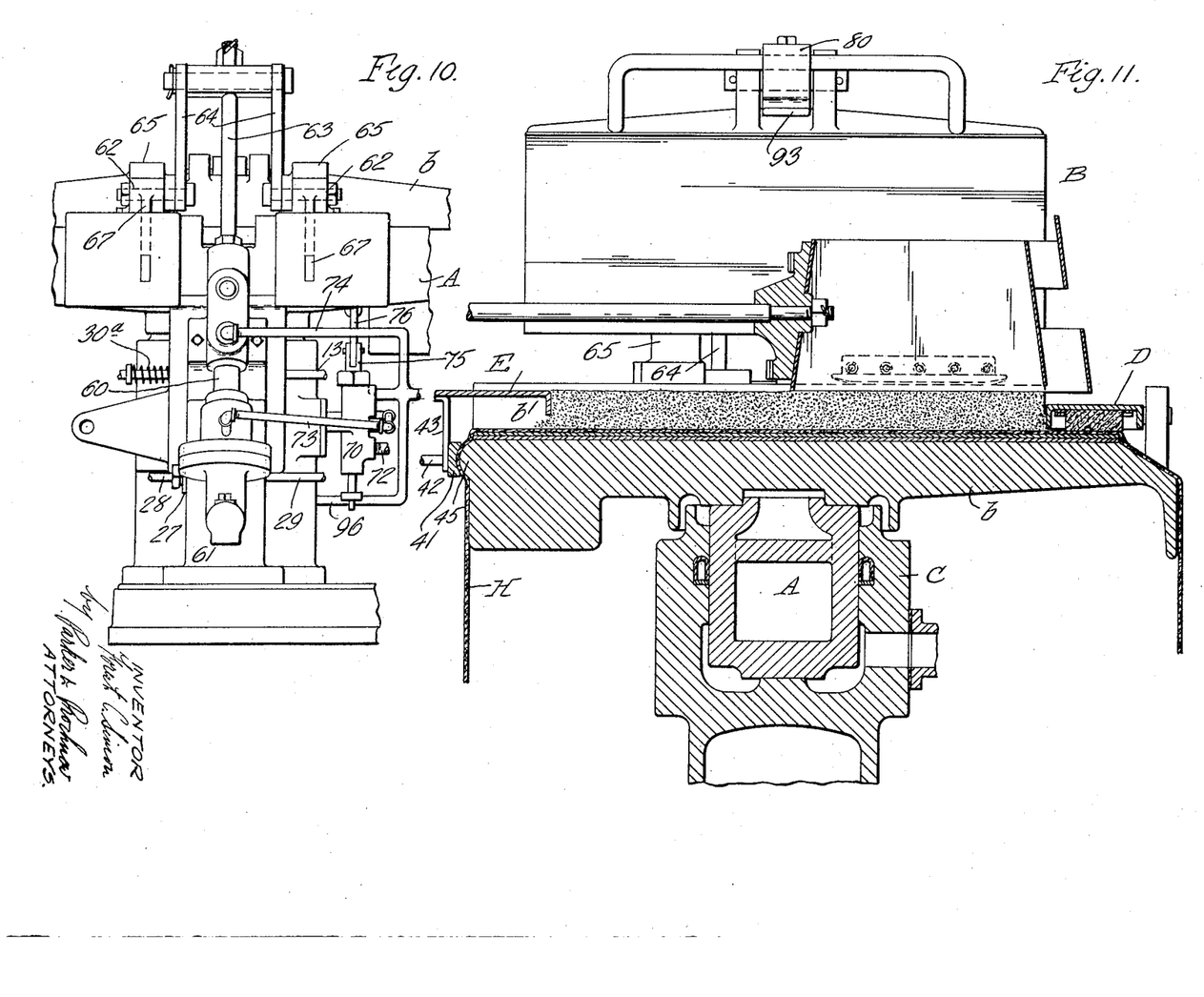
Fig. 10. is a fragmentary, rear elevation of the cake mold and associated parts of the machine with the head block in closed position.
Fig. 11 is a fragmentary, longitudinal sectional elevation of the cake mold and associated parts showing the end gates in operative position and the charge box in its forward or advanced position over the cake mold.
Figure 14:
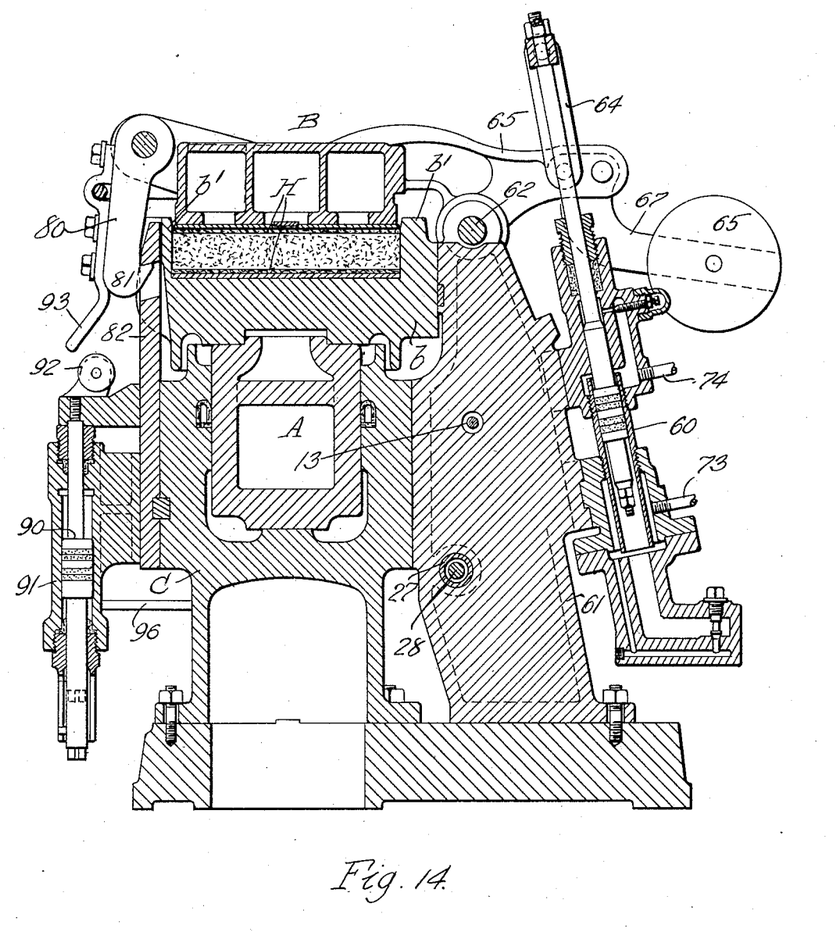
Fig. 14 is a transverse, sectional elevation of the machine on an enlarged scale, line 14—14, Fig. 8, but showing the head block in its pressing position.

As shown in Figs. 9 and 14, the piston 63 in cylinder 60 cushions on both the upward stroke and the downward stroke upon entering the cylinder end castings when raising and lowering the swinging head block so as to prevent any shock or jar in stopping the head block at either end of the piston stroke.

The head block is locked in its lower pressing position in which it enters the upper portion of the mold so as to bear on the cake, by a latch 80 which, as shown, is pivoted to the front end of the head block and provided with a hook 81 adapted to enter a hole in a keeper 82 secured on the front of the ram cylinder C for holding the head block down. The latch is preferably weighted so that it will swing by gravity into engagement with the keeper 82 when the head block is lowered. The latch is released to permit the head block to be swung up from its pressing position by a fluid-pressure-actuated releasing device which may consist of a piston 90 arranged to move vertically in a cylinder 91 fixed at the front side of the ram cylinder C and carrying at the upper end of its piston rod, which extends out of the upper end of the cylinder 91, a roller 92, adapted when the piston is raised, to engage the inclined face of a cam 93 secured to the lower end of the latch 80. The upward movement of the roller against said cam 93 operates to disengage the hooked end of the latch from the keeper. The latch-releasing device is controlled by the operating valve 70 for the head block B, the upper end of the valve-releasing cylinder 91 being connected to the valve 70 by pipes 95 and 73, so that when the valve 70 is actuated to lower the head block, the pressure liquid is admitted to the upper end of the latch-releasing cylinder 91, whereby the latch piston descends and moves the roller 92 away from the cam 93 so as to permit the latch to engage the keeper and lock the head block in its pressing position. When the valve is released for raising the head block, the pipe 95 leading from the upper end of the latch-releasing cylinder is connected to the discharge pipe and the pressure fluid, admitted to the lower end of the cylinder 91 through the pipe 96, acts to raise the piston 90 and connected roller 92 to disengage the latch from the keeper and release the head block. The fluid connections to the releasing cylinder 90 are such that fluid pressure is maintained at all times on the lower end of the latch-releasing piston tending to move it in a direction to release the latch.

When the head block has been lowered to and locked in its pressing position, as explained, liquid pressure is admitted to the lower end of the ram cylinder C to raise the ram and compress the cake between the ram cap and the head block by actuation of the ram control valve 98, by means of its operating lever or handle 99 in the usual manner. After the cake has been compressed, the lever 99 is lowered, preferably by a spring 100 to permit the discharge of pressure liquid from the ram cylinder and allow the descent of the ram. The lever 76 is then released to move the valve 70 to a position to release the latch 80 and raise the head block B. The cake is then removed from the cake mold and the machine is ready for forming the next cake by a repetition of the described operation. The arrangement and construction of the valves 70 and 98 and their operating levers 76 and 99 are such that the operator must hold the lever 76 up with one hand while he actuates the other lever 99 with his other hand to operate the ram B. Both hands are therefore occupied until the head block has been lowered and the ram elevated to press the cake, and injury to the operator's hands is thus prevented.

I claim as my invention:

1. In a cake molding machine, the combination of a cake mold having a pivotally movable end wall member provided with a handle by which it may be grasped and moved to a predetermined operative position, a charge box movable to deposit material in the mold, and operating means for the charge box controlled by the movement of said end member and operating only when the end member is moved its full stroke by hand to its operative position at the end of the mold to actuate said operating means to advance said charge box to deposit the material in the mold.

2. In a cake molding machine, the combination of a cake mold having a transversely movable end wall member provided at its front end with a handle for manual operation, a charge box for the material to be molded, fluid pressure actuated mechanism for advancing said charge box to deposit the material in the mold and retract the charge box, and mechanism for operating said fluid pressure actuated mechanism to advance said charge box, and which operating mechanism is under the control of said manually operable end wall member and is actuated directly thereby when said member is moved by hand through its full stroke to place it in its operative position at the end of said mold.

3. In a cake molding machine, the combination of a cake mold having a movable wall member provided with a handle for movement to a predetermined operative position; a charge box for the material to be molded, fluid-pressure actuated mechanism for moving said charge box to deposit the material in the mold, a controlling valve for said fluid-pressure actuated mechanism, and mechanism interposed between said valve and said movable wall member and which is actuated by the latter, and only when the same has been moved by hand to its operative position, whereby said valve is operated to advance the charge box to deposit the material in the mold.

4. In a cake molding machine, the combination of a cake mold having a movable wall member, a charge box for the material to be molded, fluid-pressure-actuated mechanism for moving said charge box to and from the mold, a valve controlling said fluid-pressure-actuated mechanism, a clutch for operating said valve, connections by which the movement of said movable member actuates said clutch to operate said valve for advancing the charge box to deposit the material in the mold, and means for uncoupling said clutch from said valve to permit the operation of said valve to return the charge box.

5. In a cake molding machine, the combination of a cake mold having a movable wall member, a charge box for the material to be molded, fluid-pressure-actuated mechanism for moving said charge box to and from the mold, a valve controlling said fluid-pressure-actuated mechanism, actuating connections from said movable member to said valve including a clutch whereby the movement of said movable member moves said valve to advance the charge box, and mechanism which operates when the charge box has deposited its charge in the mold to release said clutch to permit the return movement of said valve and charge box.

6. In a cake molding machine, the combination of a cake mold having a movable wall member, a charge box for the material to be molded, a fluid-pressure-actuated mechanism for moving said charge box to and from the mold, a valve controlling said fluid-pressure-actuated mechanism, actuating connections from said movable member to said valve including a clutch whereby the movement of said movable member actuates said clutch and causes said valve to operate for moving said valve to advance the charge box.

7. In a cake molding machine, the combination of a cake mold, a container for the material to be molded, a charge box, a fluid pressure actuated device for moving said charge box to carry a charge of material horizontally from receiving position beneath the container to the mold, a horizontally movable end wall member for said mold, a separate, independently movable valve arranged to move horizontally for preventing discharge of material from said container when the charge box is advanced to carry a charge to the mold, and independent fluid-pressure actuated devices for effecting horizontal movement of said movable end wall member and said discharge valve to different distances to place said wall and said valve in their respective operative positions.

8. In a cake molding machine, the combination of a cake mold, a container for the material to be molded, a charge box, a fluid pressure actuated device for moving said charge box horizontally from receiving position beneath the container to carry a charge of material from the container to the mold, a movable end wall member for said mold, a valve for preventing discharge of material from said container when the charge box is advanced to carry a charge to the mold, separate fluid-pressure actuated devices for operating said movable end wall member and discharge valve, and a second hand operated end wall for said mold, directly initiating and controlling by its movement the operation of said fluid-pressure actuated devices for said movable end wall member and said discharge valve.

9. In a cake molding machine, the combination of a cake mold, a container for the material to be molded and having a discharge spout, a charge box for receiving material from said spout for delivery to said mold, a fluid pressure actuated device for moving said charge box from said spout to said mold, a horizontally movable slide valve for closing said spout when said charge box is advanced to said mold, an end wall movable horizontally to close one end of said mold, separately operable, fluid pressure actuated devices, each having a different stroke for independently moving said valve and said end wall to their respective operative positions, and a second, hand operated transversely movable end wall for the other end of said mold, which, by its movement, directly initiates and controls the fluid pressure actuated devices for said charge box, said valve and said other end wall.

10. In a cake molding machine, the combination of a cake mold having a transversely movable, independently operable wall member, a container for the material to be molded, a charge box carrying material from the container to the cake mold, a slide valve for preventing discharge of material from the container when the charge box is advanced to carry a charge to the mold, and mechanism controlled by said transversely movable wall member and operating upon movement of said wall member to molding position to actuate said discharge valve.

11. In a cake molding machine, the combination of a cake mold having a movable end wall member, a container for the material to be molded, a charge box, mechanism for moving said charge box horizontally from receiving position beneath the container to carry a charge of material from said container to said mold and return the charge box, a discharge valve for preventing the discharge of material from said container when the charge box is advanced to carry a charge to the mold, separate actuating devices for independently advancing said movable member and said discharge valve when the charge box is advanced, and means whereby said charge box returns said movable member and discharge valve when the charge box is retracted.

12. In a cake molding machine, the combination of a cake mold having a movable end wall member, a container for the material to be molded, a charge box for carrying charges of material horizontally from receiving position beneath the container to the cake mold, a separate discharge valve for preventing discharge of the material from the container when the charge box advances to the cake mold, said end wall member, said charge box and said discharge valve each having a different travel to perform its particular function and separate fluid-pressure-actuated devices for causing said charge box, said movable member and said discharge valve each to travel its required distance.

13. In a cake molding machine, the combination of a cake mold having a movable end wall member, a container for the material to be molded, a charge box for carrying charges of material horizontally from receiving position beneath the container to the cake mold, a discharge valve for preventing discharge of the material from the container when the charge box advances to the cake mold, separate fluid-pressure-actuated devices for moving said charge box, said movable member and said discharge valve, and a second end wall member which controls by its movement the pressure fluid to said actuating devices for said charge box, said first movable end wall member and said valve.

14. In a cake molding machine, the combination of a cake mold adapted to have a press cloth placed therein, a charge device movable for depositing material to be molded in said mold, and a holder which is positively operated independently of the charge box to press against and hold said press cloth when said charge device is moved relatively to the mold.

15. In a cake molding machine, the combination of a cake mold having an open end permitting a press cloth to be placed in said mold with an end thereof extending out of said open end of the mold, an end member movable to and from a position at the open end of said mold over said press cloth, a charge device movable for depositing material to be molded in said mold, and a holder which is positively operated independently of the charge device to engage the extending end of said press cloth and hold the cloth when said charge device is moved relatively to the mold.

16. In a cake molding machine, the combination of a cake mold in which a press cloth is adapted to be placed with an end thereof extending out of said mold, a charge device movable for depositing material in said mold, a holding device, and positively actuated mechanism other than the charge box for moving said holding device to engage the extending end of said press cloth and hold the press cloth when said charge device is moved to deposit the material in said mold.

17. In a cake molding machine, the combination of a cake mold in which a press cloth is adapted to be placed with an end thereof extending out of said mold, a charge device movable for depositing material in said mold, and a yieldable holding device which is positively moved independently of the charge device to engage the extending end of said press cloth and hold the press cloth when said charge device is moved relatively to said mold.

18. In a cake molding machine, the combination of a cake mold having an open end and adapted to have a press cloth laid therein with an end thereof extending out of the open end of the mold, an end member movable to and from a position at the open end of said mold, a charge device movable to deposit material in said mold, actuating mechanism other than the charge device for moving said end member to the open end of said mold, and a holding device movable with said end member and adapted to engage the extending end of the press cloth for holding the press cloth during the movement of said charge device.

19. In a cake molding machine, the combination of a cake mold having an open end and adapted to have a press cloth laid therein with an end thereof extending out of the open end of the mold, an end member movable to and from a position at the open end of said mold, a charge device movable to deposit material in said mold, actuating mechanism other than the charge device for moving said end member to the open end of said mold, and a holding device carried by said end member and adapted to yieldingly clamp the extending end of the press cloth against a cooperating part to hold the cloth during the movement of said charge device.

20. In a cake molding machine, the combination of a cake mold and a cooperating relatively movable head between which material in the mold is compressed, a cylinder, a double acting, fluid pressure operated piston therein for moving said head to and from pressing relation to said mold, controlling means therefor for actuating said piston alternately toward and from said mold, said means including a valve for admitting constant pressure to one end of said cylinder so as to cause said piston to normally hold and prevent movement of said head toward said mold, said valve being operable to admit pressure fluid to the opposite end of said cylinder for moving said head into operative relation to said mold, and means for producing relative movement between said mold and said head for compressing the material.

21. In a cake molding machine, the combination of a cake mold and a cooperating relatively movable head between which material in said mold is compressed, fluid-pressure-actuated means for moving said head to and from pressing relation to said mold, controlling means for the fluid pressure operable to admit the fluid pressure to said actuating means for moving said head both toward and from said mold, said means including a valve operable to maintain fluid pressure on said actuating means in a manner to positively prevent movement of said head toward said mold except when said controlling means is operated to move said head toward the mold, means for producing a relative movement between said mold and head for compressing the material, and a weight connected to said head for preventing movement of the same toward said mold except by the operation of said control means for said fluid-pressure-actuated means, and in the event of failure of said fluid pressure.

22. In a cake molding machine, the combination of a cake mold and a cooperating relatively movable head between which material in said mold is compressed, a self-locking latch for holding said head in pressing relation to said mold in opposition to the pressure tending to move the head out of said relation, and a fluid-pressure-actuated device automatically controlled and movable to engage and release said latch to permit said head to move away from said mold.

23. In a cake molding machine, the combination of a cake mold and a cooperating relatively movable head between which material in said mold is compressed, fluid-pressure-actuated means for moving said head to and from pressing relation to said mold, a self-locking latch for holding said head in pressing relation to said mold, a latch releasing device, and independent fluid-pressure-actuated means for moving said releasing device to release said latch and for permitting said head to move away from said mold, and a single control device by movement of which both of said means are simultaneously and automatically operable.

24. In a cake molding machine, the combination of a cake mold and a cooperating relatively movable head between which material in said mold is compressed, fluid-pressure-actuated means for moving said head to and from pressing relation to said mold, a latch for holding said head in pressing relation to said mold, a latch releasing device, independent fluid-pressure-actuated means for moving said releasing device to release said latch and permit said head to move away from said mold, and a single control device for the fluid-pressure-actuated means for said head and for said latch releasing device which is operable to effect the release of said latch upon actuation of said fluid pressure means for said head for moving said head away from said mold.

25. In a cake molding machine, the combination of a cake mold having an end member movable manually to and from operative position at one end of the mold, a charge device operable for depositing material in said mold, and which is set in operation by the movement of said end member to operative position, and a separate, fluid pressure operated safety device which operates when said charge device is operated to hold said movable end member in its operative position, and common means for controlling the actuation of said charge device and said safety device.

26. In a cake molding machine, the combination of a cake mold having a movable end member adapted to be moved manually to operative position at one end of the mold, means for moving said end member out of operative position, a safety device which is arranged adjacent that end of the mold at which said end member is located and which holds said end member from movement by said moving means, fluid pressure operating means for said safety device and means for operating said safety device to permit the movement of said end member.

27. In a cake molding machine, the combination of a cake mold having an end member movable to and from operative position at one end of the mold, a charge device movable over said end member for depositing material in said mold, and a safety device which is arranged adjacent that end of the mold at which said end member is located and is actuated by fluid pressure when said charge device is operated to hold said end member from movement into the path of said charge device.

28. In a cake molding machine, the combination of a cake mold having an end member movable to and from operative position at one end of the mold, a charge device, means for moving said charge device relative to said end member to deposit material in said mold, and a safety device which is moved and held by fluid pressure, in a position to positively hold said movable end member in its operative position during the movement of said charge device to deposit the material in the mold.

FOREST C. SIMON.